(12) United States Patent
Bracke

(10) Patent No.: US 8,328,972 B2
(45) Date of Patent: Dec. 11, 2012

(54) PROCESS FOR THE PRODUCTION OF A FOAMED ARTICLE

(75) Inventor: Kristiaan Bracke, Berlare (BE)

(73) Assignee: Recticel, Brussels (BE)

( * ) Notice: Subject to any disclaimer, the term of this patent is extended or adjusted under 35 U.S.C. 154(b) by 335 days.

(21) Appl. No.: 12/677,414

(22) PCT Filed: Sep. 18, 2008

(86) PCT No.: PCT/EP2008/062467
§ 371 (c)(1), (2), (4) Date: May 14, 2010

(87) PCT Pub. No.: WO2009/037322
PCT Pub. Date: Mar. 26, 2009

(65) Prior Publication Data
US 2010/0243128 A1      Sep. 30, 2010

(30) Foreign Application Priority Data
Sep. 21, 2007   (EP) .................................. 07117005

(51) Int. Cl.
*B29C 44/12* (2006.01)
*B29C 44/18* (2006.01)
(52) U.S. Cl. .......................................... 156/79; 264/46.4
(58) Field of Classification Search ............... 156/79; 264/45.3, 46.4, 46.6
See application file for complete search history.

(56) References Cited

U.S. PATENT DOCUMENTS 3,536,564 A * 10/1970 Duffy ............................. 156/293
4,548,861 A    10/1985 Barnes et al.
4,617,214 A    10/1986 Billarant
5,135,959 A     8/1992 Hill
5,486,256 A     1/1996 Romesberg et al.
5,885,394 A     3/1999 Scherzer et al.
2007/0190301 A1  8/2007 Saulnier

FOREIGN PATENT DOCUMENTS

GB   1 230 573 A    5/1971
WO   9323237 A1    11/1993

OTHER PUBLICATIONS

Russian Office Action 2010115193/05/(021510); Jun. 9, 2012.

* cited by examiner

*Primary Examiner* — Michael Tolin
(74) *Attorney, Agent, or Firm* — Sughrue Mion, PLLC

(57) ABSTRACT

The foamed article is produced starting from a core layer (1) which comprises a flexible, open-cell foam having voids forming at least 90% of the volume of the open-cell foam. The core layer (1) is applied in a mold (6, 8), optionally together with an upper (3) and/or a lower cover layer (2), between a lower (5) and an upper mold surface (9) thereof. The mold (6, 8) is closed and a curable, foamable composition (7) is allowed to foam in the mold to produce a further foam filling the voids of the open-cell foam. In order to enable to use less foamable composition (7) to fill the voids of the open-cell foam, the core layer (1) is laid onto the lower mold surface (5) and the foamable composition (7) is sprayed onto the core layer (1) lying onto the lower mold surface so that the foamable composition (7) can penetrate at least partially by gravity into the open-cell foam core layer (1). Moreover, the foamable composition (7) has a dynamic viscosity, measured at a shear rate of 1/s, of lower than 1000 mPa·s when arriving onto the core layer (1).

25 Claims, 3 Drawing Sheets

PROCESS FOR THE PRODUCTION OF A FOAMED ARTICLE

The present invention relates to a process for the production of a foamed article, in particular a sheet-like or a panel-like article, comprising the steps of providing at least a core layer for said article, which core layer comprises a flexible, open-cell foam having open voids forming at least 90% of the volume of the open-cell foam; applying said core layer between a lower and an upper mould surface; allowing a curable, foamable, isocyanate based liquid composition to foam in the open voids of said open-cell foam to produce a further foam filling these open voids while the core layer is maintained between the upper and lower mould surfaces; and removing the produced article from between the upper and lower mould surfaces.

In the prior art, two different methods are disclosed for filling the open voids of an open-cell foam, more particularly of a reticulated foam, with a foam to produce a foam filled open-cell foam.

In a first method, which is disclosed in U.S. Pat. No. 4,548,861, the open-cell foam is a reticulated polyurethane foam which is relatively stiff due to the fact that it is preloaded with dielectric and/or magnetic particles so that the foam absorbs electromagnetic waves. To produce rigid, structural panels of such reticulated foam, the open cells (i.e. the open voids) of the reticulated foam are filled with a closed-cell rigid polyurethane foam. This is done by pouring the foamable composition for producing the closed-cell polyurethane foam in a mould and by positioning a sheet of the reticulated foam subsequently into the mould on top of the foamable composition. The mould is then closed to allow the foamable composition to expand into the interstices (open voids) of the reticulated foam sheet.

In a second method, cover layers are applied on both sides of the reticulated foam layer to produce a sandwich structure. Such a method is disclosed for example in JP 11/042655. In this method the reticulated foam layer serves as spacer material to keep the two cover layers apart. To produce the sandwich structure, the reticulated foam layer and the cover layers are positioned in a mould, the mould is closed and the curable, foamable composition is injected in the closed mould according to the reaction injection moulding (RIM) technique.

A drawback of both prior art methods is that the foamable composition has to be applied with a relatively high degree of overpacking (i.e. the average density of the produced foam has to be considerably higher than its free rise density) in order to be able to fill the open voids of the reticulated foam substantially completely with the further foam. In the first method, the foamable composition has indeed to rise entirely into the reticulated foam. Due to the increasing viscosity of the foaming composition during the rising of the foam, the resistance offered by the reticulated foam struts also increases, so that a larger amount of foamable composition is required in order to be able to penetrate entirely into the reticulated foam. In the second method, the foamable composition is injected through one injection gate (or through a limited number of injection gates) into the mould cavity. Due to the relatively large distance over which the foaming composition has to be spread laterally through the reticulated foam in the mould, also here a larger amount of the foamable composition has to be injected in the mould in order to fill the reticulated foam also in the more remote locations of the mould.

An object of the present invention is now to provide a new process which enables to reduce the amount of foamable composition which is required to fill the open voids of the open-cell foam.

To this end the process according to the present invention is characterised in that the curable, foamable composition is sprayed onto the core layer and has a dynamic viscosity, measured at a shear rate of 1/s, of lower than 1000 mPa·s when arriving onto the core layer, the core layer being held in a lying position when spraying the foamable composition thereon so that the sprayed foamable composition is allowed to penetrate at least partially by gravity into the open-cell foam of the core layer.

The present inventors have found that this process allows to reduce the amount of foamable composition required to fill the open cells or in other words the open voids of the open-cell foam, the open voids being preferably filled for at least 80 vol. %, preferably for at least 90 vol. % and more preferably for at least 95 vol. % with said further foam.

The foamable composition can be sprayed at least partially directly into the open voids of the open-cell foam, for instance when the core layer is not covered by a cover layer or when the core layer is covered by an open cover layer (showing openings). On the other hand, when the core layer is covered by a closed but permeable cover layer, the low viscous foamable composition sprayed on top of this cover layer can penetrate by gravity through the cover layer and can further seep into the open-cell foam layer substantially before it starts to rise and before it becomes too viscous to flow. The material of the open-cell foam is preferably such that the material itself, i.e. the cell struts, does substantially not absorb the foamable composition. In this way, also less foamable composition is required to fill the open-cell foam.

Filling the open voids of a reticulated foam core with a foamable composition is already known from U.S. Pat. No. 5,135,959. The foamable composition described herein however is not an isocyanate based foamable composition but a polyimide foam precursor. Using such foam precursor offers several drawbacks. First of all, a polyimide foam precursor is usually applied in a powdery form. According to U.S. Pat. No. 5,135,959 such powder is spread over a relatively fine celled reticulated foam (having 10-100 pores per linear inch), which is then placed in a mould and heated to the foaming and curing temperature of the polyimide foam precursor so that the polyimide foam fills the open voids of the reticulated foam. According to the disclosed examples, such polyimide foam precursor require a heating temperature of more than 200° C. (which is, as appears from U.S. Pat. No. 3,554,939, higher than the melting point of the precursor) during 20 minutes to allow the precursor to foam, and even a much higher temperature (235° C.) during several hours in order to allow curing of the polyimide foam. By using an isocyanate based foamable composition according to the present invention, the drawback of such high temperatures and long times for foaming and curing the foamable composition, are not at all required. On the contrary, due to the usually high reactivity of the isocyanate based foamable composition, the present invention allows to cure the foamable composition at relatively low temperatures (lower than 120° C. or even lower than 90° C.) and within a short time of only several minutes. Besides applying the polyimide foam precursor as a powder, U.S. Pat. No. 5,135,959 also discloses to impregnate the reticulated foam with a viscous polyimide foam precursor. This can be done by spraying the liquid polyimide foam precursor thinned with a solvent onto the reticulated foam or by dipping the reticulated foam in the polyimide foam precursor and squeezing out the excess liquid polyimide foam precursor, before the reticulated foam is placed in an oven to foam and cure the polyimide foam as described before. Applying a liquid polyimide foam precursor even requires a further drying step before foaming and curing the polyimide foam. These additional processing steps of squeezing out the excess of liquid foam precursor and drying the solvent before curing the foam precursor, are totally avoided by the process according to the invention (wherein the curable, foamable, isocyanate based composition does not have to contain a solvent in order to have a sufficiently low viscosity and wherein this foamable composition preferably contains no solvent or less than 5 wt. % of solvent). Moreover, even without having to squeeze out excess of the liquid foam precursor, the process of the current invention allows to obtain a lower degree of overpacking, i.e. reducing the amount of foamable composition which is required to fill the open voids of the reticulated foam core. This is achieved by spraying a low viscous isocyanate based foamable composition onto an open-cell foam so that this composition can penetrate at least partially by gravity into the open-cell foam, so that it can rise more freely and so that less foamable composition is needed to fill the open voids of the reticulated foam. In the process according to the invention, all of the foamable composition which is sprayed onto the core layer is preferably allowed to foam so that there is no need to remove the excess of foamable composition prior to the foaming step.

Spraying a foamable isocyanate based composition onto both cover layers of a sandwich structure is already known per se, more particularly from FR-A-2 171 949 and DE-A-101 53 973. The core layer used in these prior art processes is a relatively rigid honeycomb structure, which is in contrast to the flexible, open-cell foam layer used as the core layer in the process of the present invention. The process disclosed in FR-A-2 171 949 is a continuous process wherein the foamable composition is sprayed onto the inner sides of the two cover layers, which are subsequently applied onto the honeycomb core layer so that the foaming composition partially penetrates into the core layer to adhere the cover layers to the core layer. In the process disclosed in DE-A-101 53 973, the first cover layer is positioned in a mould, a first portion of the foamable composition is sprayed onto this first cover layer, a honeycomb core layer is positioned onto the first cover layer, the second cover layer is positioned onto the core layer, a second portion of the foamable composition is sprayed onto the second cover layer and the mould is closed. The foamable composition rises to produce a foam which again only partially penetrates into the core layer to adhere this core layer to the cover layers.

A drawback of these known processes is that the used honeycomb core layers cannot be conformed easily to the shape of a three-dimensionally shaped mould surface and that such honeycomb core layers often tear or crack when subjecting them to relatively large deformations. In the process according to the present invention, use is therefore made of a flexible, open-cell foam layer, in particular a drapable foam layer, which can easily be applied and deformed in a three-dimensionally shaped mould. Another advantage of an open-cell foam layer is that it may have a lower specific weight than a honeycomb structure. In contrast to honeycomb layers, flexible, open-cell foam layers have however to be filled substantially entirely with the further foam to obtain a certain resistance against compression.

WO 2007/101868 discloses a process wherein the two sides of a honeycomb core layer, each covered with a glass fibre cover layer, are first sprayed with a low density curable polyurethane composition, after which this layered material is compressed and cured in a compression mould. A drawback of this method is that a relatively large amount of curable composition is required to achieve a substantially complete filling of the honeycomb core material resulting thus in a more expensive and heavier sandwich material. This is first of all due to the fact that the structure of the honeycomb material prevents the curable material to be distributed in all directions of the honeycomb material, and secondly that the polyurethane composition is absorbed by the honeycomb core material, As explained hereabove, the present invention provides however a solution to this problem involving the use of an open-cell foam as core layer and spraying the foamable composition onto this core layer while it is held in a lying position so that this foamable composition can penetrate immediately, at least partially by gravity, into the open-cell foam of the core layer. The open-cell foam layer will allow the foamable composition to be distributed in all directions of this layer so that it is not necessary to spray an excess of foamable composition in order to ensure that all the cells are filled, even when only side of the core layer is sprayed An advantage of the use of a flexible, open-cell foam layer is that the weight of such a foam layer may be much smaller than the weight of a honeycomb structure and that a flexible, open-cell foam layer can easily stretch so that, in contrast to the method disclosed in WO 2007/101868, it is not necessary to wrinkle the core layer to form pleats during the moulding, which further increases the weight of the obtained article.

In a preferred embodiment of the process according to the invention, the open-cell foam, more particularly the reticulated foam, has an average cell size of between 2000 and 7000 µm, and preferably an average cell size larger than 3000 µm, more preferably larger than 4000 µm.

Foams, in particular reticulated foams, having such a relatively large cell size provide less resistance to the penetration of the foamable composition and the rising of the foam.

Preferably, the open-cell foam in said core layer has, in its uncompressed state, an average thickness which is at least equal to said average cell size, and which is preferably smaller than twenty times said average cell size, more preferably smaller than ten times said average cell size and most preferably smaller than five times said average cell size.

In this way, the open-cell foam is sufficiently coherent whilst the foamable composition can penetrate immediately after spraying relatively far into the core layer before starting to rise.

In the process according to the invention the entire amount of foamable composition used to produce the article does not need to be sprayed onto the core layer held in its lying position. A portion of the foamable composition could for example be sprayed onto the lower mould surface, more particularly onto a first cover layer laid thereon, before positioning the core layer on the lower mould surface or onto this first cover layer. A portion of the foamable composition could also be sprayed onto the upper mould surface, more particularly onto a second cover layer applied against the upper mould surface before this upper cover layer is positioned on top of the core layer. These portions of the foamable composition may thus serve to improve the adhesion between the core layer and the cover layers. Preferably, at least 75 wt. %, more preferably at least 90 wt. % of the foamable composition is however applied by spraying it onto the core layer while this core layer is held in a lying position in order to be able to obtain a reduction of the average density of the produced foam.

The process according to the invention is either a continuous or a discontinuous moulding process. When it is a continuous process, the upper and lower mould surfaces are formed by a conveyor system. When it is a discontinuous process, the upper and lower mould surfaces are formed by upper and lower sections of a mould which can be opened and closed. In a discontinuous process, the core layer is preferably held in its lying position by laying it onto the lower mould surface before spraying the foamable composition thereon.

Other particularities and advantages of the invention will become apparent from the following description of some particular embodiments of the process according to the present invention. The reference numerals used in this description relate to the annexed drawings wherein.

DEFINITIONS AND TEST METHODS

Overpack or Degree of Overpacking

This value indicates the difference between the free rise density of the foamable composition and the actual density of the further foam produced by this foamable composition in the open cells of the open-cell foam (assuming complete filling of the open-cell foam). It is determined by the following formula:

$$\text{overpack} = \frac{\text{moulded density} - \text{free rise density}}{\text{free rise density}} \times 100.$$

In practice, the moulded density can be determined based on the volume of the produced article ($V_a$), on the weight of the produced article ($W_a$) and on the weight of the core layer ($W_c$) with the following formula:

$$\text{moulded density} = \frac{W_a - W_c}{V_a}.$$

The volume taken in by the open-cell foam (i.e. by the struts and by any closed cells thereof) is thus not taken into account when determining the moulded foam density.

In case one or more cover layers are present, the volume and weight of these cover layers and the weight of the cured foamable composition contained in these cover layers should not be taken into account (for example by removing the cover layers and by determining the moulded density for the remaining core part of the foamed article as described hereabove).

Free rise density: determined in accordance with ISO 1183.

Open-Cell Foam

An open-cell foam is a foam which comprises open voids forming at least 90% of the volume of the foam. The open voids of the open-cell foam are those volumes of the open-cell foam which are not occupied by struts or by any closed cells which may be present in the open-cell foam.

Reticulated Foam

A reticulated foam is a special type of an open-cell foam. Reticulated foams are produced by converting a finished closed-cell or open-cell foam to a completely open-cell foam by breaking or removing the cell walls. Various mechanical, chemical and thermal methods to reticulate foams are known and are for example disclosed in U.S. Pat. Nos. 3,405,217, 3,423,338, 3,425,890 and 4,670,477.

Average Cell Size

This size can be determined by the Visiocell method developed by Recticel, as described on p. 8, l. 21-p. 9, l. 8 of WO 2007/031517.

Drapable and Drapability

A drapable core layer is a core layer which can be draped onto a three-dimensionally shaped mould surface, i.e. which can cover such a mould surface following generally the contours thereof. It more particularly has a flexural resistance, measured in accordance with ASTM 4032, of less than 150 N, preferably of less than 100 N and more preferably of less than 50 N.

Flexural Resistance

The flexural resistance of the core layer is determined by the modified circular bend test, ASTM 4032-82, as set forth in the Example of EP-B-1 323 398.

Figure 1:
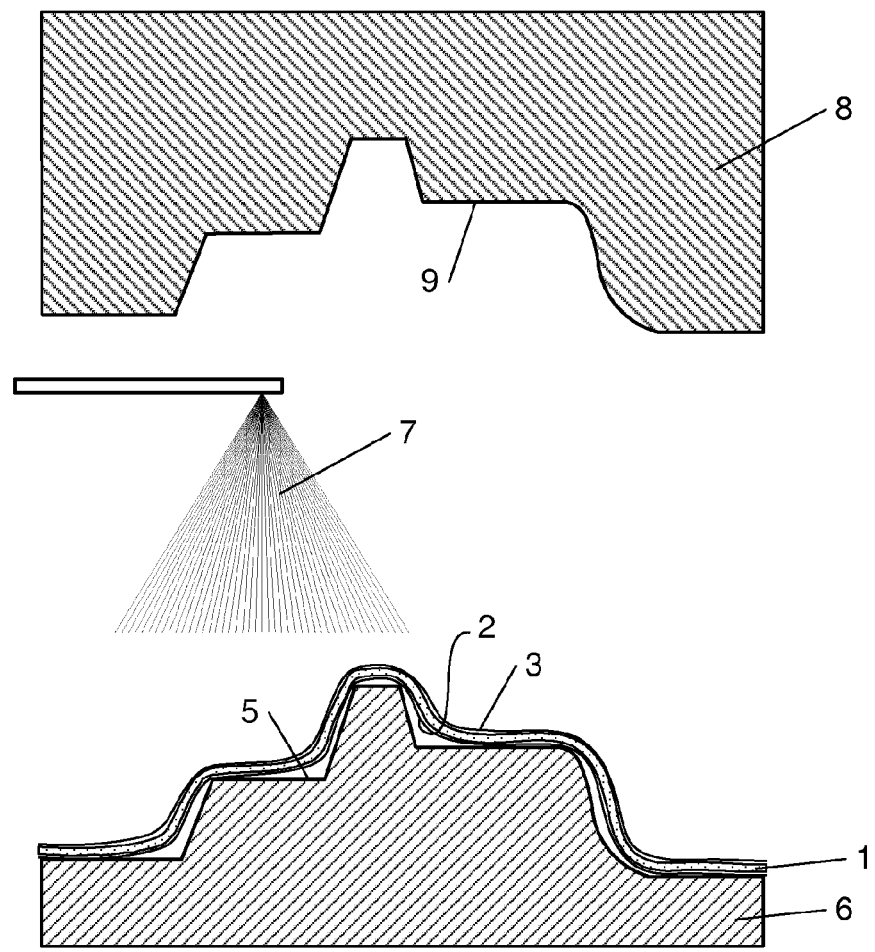
FIG. 1 is a simplified vertical sectional view showing a compression mould wherein a lower cover layer, a core layer consisting of an open-cell foam layer and an upper cover layer are laid on the lower mould surface and wherein a foamable composition is being sprayed onto the core layer, more particularly onto the upper cover layer lying onto the core layer.
Figure 2:
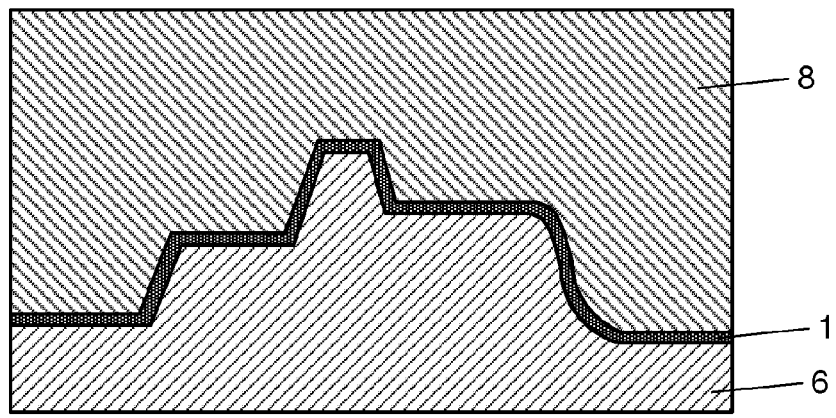
FIG. 2 illustrates the next manufacturing step wherein the compression mould is closed and the foamable composition is foaming and curing to fill the open-cells of the open-cell foam layer with a further foam.
Figure 3:
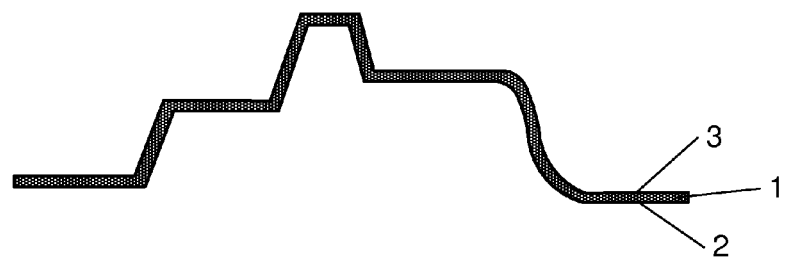
FIG. 3 shows a cross-section of the produced foamed article, more particularly the sandwich structure formed by the open-cell core layer filled with the foam produced from the foamable composition and by the two cover layers adhered to the core layer.
Figure 4:
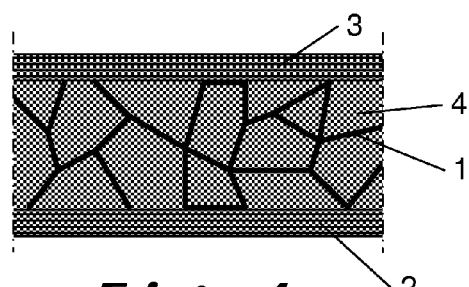
FIG. 4 shows, on a larger scale, a portion of the cross-section of FIG. 3.

In the method illustrated in FIGS. 1 and 2, a foamed article is made, more particularly a three-dimensionally shaped sandwich structure, which is further illustrated in FIGS. 3 and 4. It comprises a core layer 1 consisting of a flexible, open-cell foam, a lower cover layer 2 on the lower side of this core layer 1 and an upper cover layer 3 on the upper side of the core layer 1. The open-cell foams comprises at least 90%, preferably at least 95% and more preferably at least 98% open cells. These open cells or open voids of the open-cell foam core layer 1 are filled for at least 80 vol. %, preferably for at least 90 vol. % and more preferably for at least 95 vol. % with a further foam 4. This further foam 4 has a smaller cell size than the open-cell foam of the core layer 1.

The cover layers 2 and 3 comprise in particular reinforcing layers, more particularly layers which contain fibres such as glass fibre mats or finer glass fibre veils, glass fibre non-wovens, glass fibre random structures, glass fibre tissues, chopped or ground glass or mineral fibres, natural fibre mats and knitted or woven fabrics, chopped natural fibres and fibre mats, fibre non-wovens and knitted fabrics based on polymer fibres, carbon fibres of aramide fibres, or mixtures thereof. The reinforcing layers may be the same on both sides of the core layer or may also be different. The invention is not restricted to reinforcing layers as cover layers or as only cover layers. One of the cover layers, or both cover layers, may also comprise an aesthetic layer, such as a leather or an artificial leather skin, a carpet or cloth textile layer. When such aesthetic layer, which will form the visible front side of the article, is permeable for the foamable composition, an additional impermeable cover layer should be provided between the outer aesthetic cover layer and the core layer. The cover layers may also be rigid and may in particular be formed of rigid sheets, such as a metal or wooden sheets, used to cover for example wall panels or table tops or other products for structural applications.

The core layer 1 is intended to keep the cover layers 2, 3 near the surface of the sandwich structure (at the location of the highest tensile stresses) when moulding the sandwich structure. The core layer 1 comprises a flexible, open-cell foam. An important advantage of such a flexible foam layer 1 is that, compared to for example rigid honeycomb structures, it can be applied much more easily onto a complex, three-dimensionally shaped mould surface, i.e. without risking to be torn, cracked or damaged. A flexible, open-cell foam layer, in particular a reticulated foam layer, may also have a density which is lower than the density of a honeycomb structure and needs moreover not to be wrinkled when applying it onto a three-dimensionally shaped mould surface thus resulting again in a lower weight of the produced article. The open-cell foam of the core layer 1 is preferably stretchable and has more preferably an elongation, measured in accordance with ISO 1798, of at least 100%, preferably of at least 150%.

The open-cell foam of the core layer 1 may be a polymeric thermoplastic foam, such as for example ethylene-propylene-diene rubber foam, or it may be a polymeric thermoset foam, such as a polyurethane foam. Polymeric foams can be produced according a lot of different technologies, as described in US 2006/0026970. The preferred open-cell foam is a reticulated foam, in particular a reticulated polyurethane foam. Preferably, the open-cell foam has an average cell size of between 2000 and 7000 μm, and more preferably an average cell size larger than 3000 μm, most preferably larger than 4000 μm.

The core layer 1 is preferably so flexible that its E-modulus, measured in accordance with ISO 527-3, is smaller than 0.5 MPa. The core layer 1 is further preferably even drapable so that it can be laid very simply onto the mould surface. The open-cell foam of the core layer 1 has preferably a density of less than 60 kg/m$^3$, more preferably of less than 50 kg/m$^3$ and most preferably of less than 40 kg/m$^3$. It further preferably has an CLD 40% hardness, measured in accordance with ISO3386/1, of less than 20 kPa, more preferably of less than 15 kPa and most preferably of less than 10 kPa.

The further foam 4 filling the open voids of the open-cell foam may be a flexible or a rigid one, depending upon the required properties of the foamed article. The further foam 4 is an isocyanate based foam, in particular a polyurethane foam, a polyisocyanurate foam, a polyurea foam or a polyurea modified polyurethane foam.

For producing the foamed article, more particularly the sandwich structure, illustrated in FIGS. 3 and 4, the lower cover layer 2, the core layer 1 and the upper cover layer 3 are laid, as illustrated in FIG. 1, one on top of the other onto the surface 5 of a lower mould section 6. The layers 1 to 3 can be laid successively onto the lower mould surface 5 or simultaneously. Before being laid onto the lower mould surface, they may optionally be adhered to one another, preferably only locally in order to avoid the formation of a closed film.

After having applied the layers 1 to 3 in the mould, a curable, foamable composition 7 is sprayed on top of these layers to produce the further foam 4 within the voids of the core layer 1 and to adhere the layers 1 to 3 to one another. This foamable composition comprises a curable isocyanate based composition, in particular a polyurethane, polyisocyanurate, polyurea or a polyurea modified polyurethane forming composition. The isocyanate based composition is preferably a reactive mixture which starts already to cure when being sprayed onto the open-cell foam layer.

It is clear that the upper cover layer 3 should be an open layer, i.e. a layer provided with apertures, and/or a layer which is permeable for the foamable composition 7 so that the foamable composition may penetrate into the core layer 1. The lower cover layer 2 may on the contrary be a closed, impermeable layer. The lower cover layer 2 may therefore be an impermeable aesthetic cover layer, such as a thermosetting or thermoplastic synthetic skin layer. Such a synthetic skin layer can be produced in advance, and positioned onto the lower mould surface, or it can also be produced against the lower mould surface, for example by a spray, a thermoforming or a slush moulding technique. The skin layer is preferably an elastomeric polyurethane skin layer which is obtained by spraying a polyurethane reaction mixture against a mould surface (see for example EP-B-0 303 305 and EP-B-0 389 014). The backside of the skin layer may be provided with a foam layer, in particular also by a spray process. Instead of, or in addition to the foam layer, a reinforcing layer can also be applied between the skin layer and the core layer, in particular to obtain an increased stiffness. The process according to the invention can for instance be used to make the rigid synthetic carrier of a self-supporting trim part, as described in EP0642411. The present invention allows producing light-weight trim parts such as door panels, or structural vehicle parts such as car crash pads or seat back covers.

In a next step, illustrated in FIG. 2, the mould 6, 8 is closed by lowering the upper mould section 8, having an upper mould surface 9, onto the lower mould section 6 so that the layers 1 to 3, and in particular the open-cell core foam core layer 1, are preferably compressed somewhat. The foamable composition 7 is then allowed to foam and cure in the mould cavity defined between the upper 9 and the lower mould surface 5. Subsequently, the mould is opened (not illustrated) and the produced article is removed from the mould.

An essential feature of the foamable composition 7 which is sprayed onto the core layer 1, is that it has a dynamic viscosity, measured at a shear rate of 1/s, which is smaller than 1000 mPa·s, preferably smaller than 800 mPa·s and more preferably smaller than 500 mPa·s or even smaller than 300 mPa·s, when arriving on top of the layers 1 to 3. Due to this low viscosity, and due to the fact that the layers 1 to 3 are held in a lying position and are more particularly lying onto the lower mould surface, the foamable composition can penetrate by gravity into the open-cell foam of the core layer 1, more particularly before it starts to foam and becomes too viscous. In this way, the foamable composition is distributed more evenly into the core layer 1 before it starts to foam so that the foaming composition is less hampered from rising by the open-cell foam and so that hence less foamable composition is needed to fill the open-cell foam. The open voids of the open-cell foam should indeed be filled for at least 80 vol. %, preferably for at least 90 vol. % and more preferably for at least 95 vol. %, with the further foam 4 produced by the foamable composition. Tests have shown that the required overpack can in this way be reduced to a value below 100%, in particular below 90% and more particularly even below 80%.

Although the core layer 1 should be held in a lying position when spraying the foamable composition thereon, this does not mean that the core layer 1 should be held entirely horizontal. The core layer is however preferably held under an angle smaller than 75°, preferably smaller than 60° and more preferably smaller than 45° with a horizontal plane. When the core layer is not positioned onto a flat mould surface but instead onto a two- or three-dimensionally shaped mould surface so that the core layer is two- or three-dimensionally curved when spraying the foamable composition thereon, an average inclination angle of the top surface of the core layer can be determined. The top surface of the core layer is defined by a plane which is tangent to the upperside of the core layer and which does not show the foam structure of the core layer. This tangent plane can be divided in individual flat facets having each a surface area of about 1 cm² and a width which is substantially equal to their length. Each of the facets forms an angle equal to or smaller than 90° with the horizontal plane. The number average of these angles is then the average angle of the core layer which should be smaller than 75°, preferably smaller than 60° and more preferably smaller than 45°.

To make filling of the open-cell foam easier, the open-cell foam of the core layer has preferably, in its uncompressed state, an average thickness (measured by dividing its volume by its surface area) which is smaller than twenty times its average cell size, preferably smaller than ten times its average cell size and most preferably smaller than five times its average cell size. To achieve a sufficiently consistent foam layer, the open-cell foam layer has preferably an average thickness which is at least equal to its average cell size.

The low viscosity of the foamable composition 7 enables also to spray or atomise it over the upper mould surface. Use can be made of different types of spray nozzles, including air assisted or airless spray nozzles. Preferred airless spray nozzles and spray methods are disclosed for example in EP-B-0 303 305 and EP-B-0 389 014. The foamable composition is preferably sprayed into droplets, more particularly into droplets having a medium volume diameter, determined according to ASTM E 799-81, larger than 50 μm, or in the form of a film which falls apart into such droplets at a distance from the nozzle.

The foamable composition is preferably formulated to produce a foam having a free rise density of between 20 and 100 kg/m³. In the process described hereabove with reference to FIGS. 1 and 2 the entire amount of foamable composition which is applied in the mould is applied therein by spraying it onto the core layer 1 lying onto the lower mould surface 5. A portion of this foamable composition may however also be sprayed onto the lower cover layer 2, in particular when it is lying onto the lower mould surface but before the core layer has been positioned thereon. Another portion of the foamable composition can also be applied onto the upper cover layer, before laying this upper cover layer on top of the core layer 1. In a preferred embodiment, at least 75 wt. %, preferably at least 90 wt. % of said foamable composition is however applied in the mould by spraying it onto the core layer when it is held in its lying position, more particularly when it is lying onto the lower mould surface.

Instead of first applying the upper cover layer 3 onto the core layer 1 before spraying the foamable composition thereon, the foamable composition 7, or at least a portion thereof, can also been sprayed onto the core layer 1 before covering this core layer 1 with the upper cover layer 3. This is especially advantageous in case of thicker core layers 1, for example core layers thicker than 10 mm, since the foamable composition will then penetrate deeper into the core layer before starting to foam. For thinner core layers, in particular for core layers thinner than 10 mm, the foamable composition, or at least a portion thereof, is however preferably sprayed onto the upper cover layer 3 lying onto the core layer 1.

Instead of applying an upper 3 and a lower cover layer 2 as illustrated in FIG. 1, it is also possible to apply no cover layers onto the core layer 1, or to apply only an upper cover layer 3 or only a lower cover layer 2. If no cover layers are applied, the core layer 1 no longer functions to hold the cover layer(s) against the respective mould surface(s), but it can function to modify the mechanical properties of the further foam 4. Depending on the properties of the open-cell foam of the core layer 1 and of the further foam 4, the resulting composite foam product can be used for a wide range of applications. For instance, the core layer can be a reticulated hydrophobic polyurethane foam whilst the further foam can be a hydrophilic polyurethane foam. Whilst this hydrophilic further foam will swell when it absorbs water, the reticulated foam core will be sufficiently strong to prevent an increase in the size of the product. By combining these two types of foams, the resulting composite foam overcomes the disadvantages associated with both foam types, whilst maintaining their respective advantages. Said composite foam product is for instance very useful for cleaning applications such as synthetic sponges and wipers. The reticulated foam core will not only serve to prevent swelling of the open-celled foam, but will also prevent damage to the open-cell foam, whilst still improving the abrasivity. In other applications, for instance when the further foam is a rigid foam, the open-cell foam core 1 can be used to reduce in particular the bending stiffness of the composite foam layer. Such a reduced bending stiffness is especially advantageous when the foamed article is used as substrate for automotive interior trim parts such as headliners, covers for A, B or C pillars, etc. which need to be bent during their mounting. A reduced bending stiffness reduces the risk of damaging those parts when mounting them. On the other hand, when using for example a core layer which comprises an open-cell metal foam, the core layer can also function to reinforce the foamed article.

Figure 5:
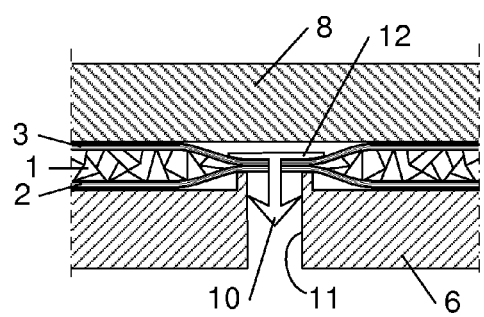
FIGS. 5 and 6 show, on a larger scale, a detail of the vertical sectional view of the mould wherein the lower and upper cover layers and the core layer have been positioned and wherein an insert has been applied through all of these layers in FIG. 5 and through only the lower cover layer in FIG. 6.

An advantage of the process according to the invention is that it is quite easy to apply inserts 10, such as clips, pins, and fasteners, in the mould so that they will be partially embedded in the produced foamed article. The flexible open-cell foam can indeed be compressed easily at the location of the inserts 10. FIG. 5 shows an embodiment wherein the insert 10 is pushed through the core layer 1 and through the upper 3 and lower cover layers 2 into a recess 11 in the lower mould section 6. When no cover layers 2, 3 are present, the insert 10 has to be pushed only through the core layer 1 (or through the core layer 1 and one cover layer when only one cover layer is provided). The insert 10 has a head portion 12 which projects laterally so that the insert 10 will be anchored in the foamed article. Due to the flexibility of the open-cell foam of the core layer 1, the core layer 1 can easily be compressed underneath the head portion 12. The head portion 12 is preferably supported by an upstanding edge on the mould surface 5, and projects over this upstanding edge so that the foamable composition 7 can penetrate underneath the head portion 12 to anchor the insert 10 in the foamed article.

In case of a large insert 10 or head portion 12, it may be useful to apply a piece of open-cell foam on top of the head portion 12, and optionally an additional piece of cover layer on top of this open-cell foam piece. The piece of cover layer may extend partially or even entirely over the cover layer 3.

Figure 6:
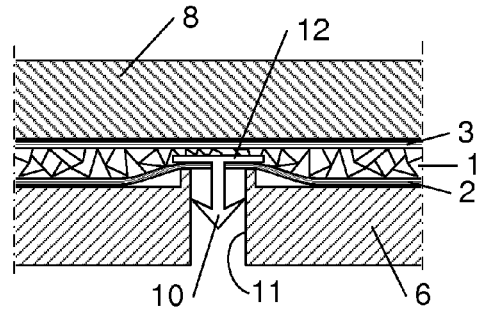

FIG. 6 shows a variant embodiment wherein an additional piece of open-cell foam and of a cover layer is not required to obtain also a strong composite material on top of the insert 10. The insert 10 is indeed applied in the mould after having positioned the lower cover layer 2 onto the lower mould surface 5 so that only the lower cover layer 2 is situated, more particularly clamped, between the head portion 12 of the insert 10 and the mould surface, more particularly the upstanding edge thereof. As can be seen in FIG. 6, due to its flexibility and large voids content, the open-cell foam of the core layer 1 can easily be compressed to a great extent above the insert 10.

In the above described embodiment, the produced foamed article has a relatively uniform thickness. When the thickness would differ considerably, it is possible to form the core layer 1 by stacking two or more layers of open-cell foam onto one another at the locations where a greater thickness is needed. On the other hand, it is also possible to apply over the entire mould surface two or more open-cell foam layers on top of one another (and to provide the head portion 12 of the insert 10 for example between two of such foam layers). Alternatively, the open-cell foam layer or layers used to form the core layer 1 may also have a non-uniform thickness, for example by moulding or cutting the foam layer.

By means of the moulding processes described hereabove, a three-dimensionally shaped foamed article can be produced. The lower 5 and upper mould surfaces 9 will then be shaped usually both three-dimensionally but it is also possible that only one of the mould surfaces 5 or 9 is shaped three-dimensionally.

Figure 7:
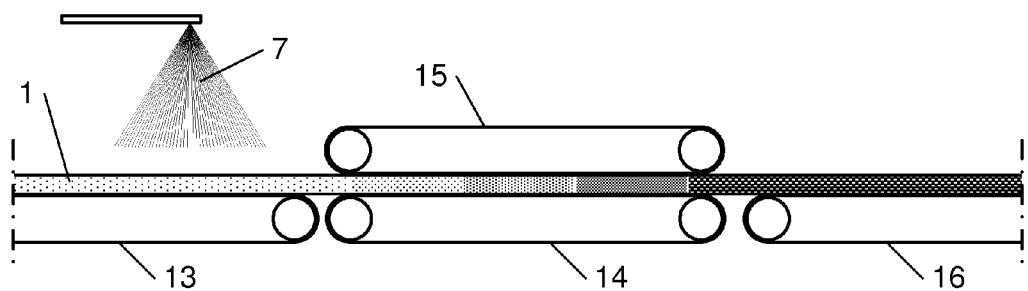
FIG. 7 illustrates a continuous manufacturing process.

Instead of producing the foamed articles according to a discontinuous process in a mould, the foamed articles can also be made according to a continuous process. Such a continuous process is illustrated in FIG. 7. In this process the core layer 1, and the optional cover layers 2 and 3, are applied onto a first conveyor 13 and the foamable composition is sprayed on top thereof while the core layer 1 is transported forwards on the first conveyor 13. The core layer 1 and the foamable composition sprayed thereon moves then onto a second conveyor 14 which forms the lower mould surface 5. The upper mould surface 9 is formed by a third conveyor 15 arranged above the second conveyor 14. When passing between these conveyors 14 and 15, the foamable composition foams to fill the voids of the open-cell foam of the core layer 1 and cures at least partially. The foamed article then leaves the moulding section, formed by conveyors 14 and 15, and is conveyed further by a fourth conveyor 16. In a next step, the continuous foamed article can then be cut into separate pieces. Also in this continuous process, it is possible to produce three-dimensionally shaped foamed articles, more particularly by providing three-dimensionally shaped mould surfaces onto the upper 15 and/or lower conveyor 14 and by synchronising these two conveyors.

The produced foamed article is preferably a sheet-like or panel like article which has two large faces and a relatively small thickness. Such a sheet-like or panel-like article does not have to be flat but may show a complex three-dimensional shape, for example when used as interior trim part of vehicles such as a door panel, an instrument panel, a seat back, a seat support or a headliner.

EXAMPLE 1

Without Covering Layers

To obtain a flat panel a flat mould was used, consisting of a lower and an upper mould section, both heated up to 65° C. The dimensions of the mould cavity were 800 mm in length and 500 mm in width while the depth of the mould was 5 mm, thus having a volume of 2 liters.

In a first step, a release agent was sprayed on both mould sections, in order to demould the foamed article more easily.

In a second step a reticulated polyurethane foam sheet was laid onto the lower mould surface. This foam sheet had a density of 30 kg/m$^3$, a thickness of 5 mm and a cell size of 4800 µm, and is commercially available under the name Bulpren S32520. This reticulated foam has an open-cell content of about 100% and thus occupies a volume of only about 0.06 liters, resulting in a rest volume (open void volume) of about 1.94 liters.

In a third step a rigid PUR foamable composition, having a free rise density of 48 kg/m$^3$, was uniformly sprayed onto the reticulated foam sheet. The dynamic viscosity of component A (polyol—Daltorim EL 17872—Huntsman) was 650 mPa·s, while for component B (MDI isocyanate—Suprasec 5030—Huntsman) the viscosity was between 185-235 mPa·s, both measured at 25° C. A total amount of 160 g of both components in a ratio of 100/190 (polyol/isocyanate) was sprayed, at a temperature of about 65° C., onto the reticulated foam sheet by means of an industrial robot, in such a way that the liquid PUR was distributed in a homogeneous way onto the reticulated foam sheet.

In a fourth step the heated mould was closed and the PUR was allowed to rise and cure in the mould for 3 minutes. After opening the mould, the part was demoulded. This resulted in a fully filled structural flat panel having the same dimensions as the mould, and having an overall density of 110 kg/m$^3$. A degree of overpacking of about $$67\% \left( = \frac{(110-30)-48}{48} \times 100 \right)$$

enabled thus a complete filling of the voids of the reticulated foam.

The presence of the reticulated foam core resulted in a lower bending stiffness compared to a pure rigid foam panel with the same dimensions and moulded density (see table 1). This clearly shows that the obtained panel is more easy to bend, thus using less force and thus less risk on damaging the panel, although it was proven that the absolute bending at break remained the same.

EXAMPLE 2

With Covering Layers

The same process was performed as in Example 1, except that the reticulated foam sheet, as described in Example 1, was covered at both sides with a continuous filament glass fiber mat (areal weight of 225 g/m$^2$, type U816/225 from Saint Gobain-Vetrotex) before the same amount of PUR foamable composition was sprayed onto it.

The obtained panel was fully filled and had an overall density of 200 kg/m$^3$ (including the reticulated foam, the glass fibre mats and the PUR contained therein). As a consequence a sandwich-like panel was formed, having excellent mechanical properties. This is especially proven by the obtained bending stiffness, as can be seen in Table 1. When comparing the foamed sandwich material obtained in this example with the sandwich material obtained in Example 1 of WO 2007/101868, it can be seen that, notwithstanding the fact that a much heavier glass fibre mat is used in the present example, the areal weight of the obtained sandwich material was still considerably lower than the areal weight of the sandwich material obtained with the honeycomb structure (about 1000 g/m$^2$ versus about 1350 g/m$^2$).

TABLE 1

| | Bending properties | |
|---|---|---|
| | Density kg/m³ | Bending stiffness Nmm |
| Pure rigid foam panel | 80 | 700 |
| Example 1 | 110 | 380 |
| Example 2 | 200 | >10000 |

EXAMPLE 3

Without Covering Layers

Figure 8:
FIG. 8 is a picture of a reticulated foam onto which an amount of a foamable polyurethane composition has been sprayed and has been allowed to foam.

In order to show the way wherein the foam is produced in the reticulated foam, Example 1 was repeated with less foamable composition. FIG. 8 is a picture of the reticulated foam containing the foamable composition which has already foamed to some extent. It can clearly be seen that the foamable composition has been deposited onto the struts of the reticulated foam mainly by being sprayed thereto but also partially by flowing along the struts by gravity. Notwithstanding the low initial viscosity of the foamable composition, most of it has been deposited on the struts of the reticulated foam. In this way, the foamable composition can rise more freely so that less foamable composition is needed to fill the open voids of the reticulated foam, i.e. so that a smaller degree of overpacking is required.

COMPARATIVE EXAMPLE

A TDI based flexible foam was produced starting from a foamable polyurethane composition having a free rise density of about 23 kg/m³. This composition was poured in a mould of 490×490×100 mm. An amount of about 720 g of the foamable composition had to be poured in the mould in order to fill it completely, the required overpack being thus 30%.

When positioning a block of reticulated foam of 490×490×100 mm and having a density of 35 kg/m³ onto the foamable composition in the mould, a considerably larger amount of foamable composition was required to fill the mould, namely about 1080 g. The required overpack was thus 95%.

The invention claimed is:

1. A process for the production of a foamed article comprising the steps of:
providing at least a core layer (1) for said article, which core layer (1) comprises a flexible, open-cell foam having open voids forming at least 90% of the volume of the open-cell foam;
applying said core layer (1) between a lower (5) and an upper mold surface (9);
allowing a curable, foamable, isocyanate based liquid composition (7) to foam in the open voids of said open-cell foam to produce a further foam (4) filling these open voids while the core layer (1) is maintained between the upper (9) and lower mold surfaces (5); and
removing the produced article from between the upper (9) and lower mold surfaces (5),
wherein the curable, foamable composition (7) is sprayed onto the core layer (1) and has a dynamic viscosity, measured at a shear rate of 1/s, of lower than 1000 mPa·s when arriving onto the core layer (1), and
wherein the core layer (1) is held in a lying position when spraying the foamable composition (7) thereon so that the sprayed foamable composition (7) is allowed to penetrate at least partially by gravity into the open-cell foam of the core layer (1).

2. A process according to claim 1, wherein said foamable composition (7) is applied with a degree of overpacking of less than 100%.

3. A process according to claim 1, wherein said foamable composition (7) is formulated to produce a foam having a free rise density of between 20 and 100 kg/m³.

4. A process according to claim 1, wherein at least 80 vol. % of said open-cell foam are filled with said further foam (4).

5. A process according to claim 1, wherein said open-cell foam comprises a reticulated polyurethane foam.

6. A process according to claim 1, wherein said open-cell foam has an average cell size of between 2000 and 7000 μm.

7. A process according to claim 6, wherein, in its uncompressed state, the open-cell foam in said core layer has an average thickness which is at least equal to said average cell size.

8. A process according to claim 7, wherein the core layer has an average thickness which is smaller than 20 times said average cell size.

9. A process according to claim 1, wherein the open-cell foam consists of a material which does not absorb the foamable composition.

10. A process according to claim 1, wherein said foamable composition (7) has a dynamic viscosity, measured at a shear rate of 1/s, of lower than 800 mPa·s, when arriving onto the core layer (1).

11. A process according to claim 1, wherein at least 75 wt. % of said foamable composition (7) is applied by spraying it onto the core layer (1) while holding the core layer (1) in said lying position.

12. A process according to claim 1, wherein the foamable composition (7) is sprayed on a first side of the core layer (1), which first side is covered with at least one first cover layer (3) before and/or after having sprayed the foamable composition (7) onto the core layer (1).

13. A process according to claim 12, wherein the core layer (1) is covered with said first cover layer (3) and the foamable composition (7) is sprayed onto this first cover layer (3), the first cover layer (3) being permeable for the foamable composition (7) to enable the foamable composition (7) to penetrate through the first cover layer (3) into the core layer (1).

14. A process according to claim 1, wherein the foamable composition (7) is sprayed on a first side of the core layer (1) and the core layer (1) has a second side, opposite the first side, which second side is covered with at least one second cover layer (2), the second cover layer (2) comprising a layer which is impermeable for said foamable composition.

15. A process according to claim 1, wherein said core layer (1) is drapable and is draped over the lower mold surface (5).

16. A process according to claim 1, wherein said open-cell foam has a density of less than 60 kg/m³.

17. A process according to claim 1, wherein said open-cell foam is stretchable and has an elongation, measured in accordance with ISO 1798, of at least 100%.

18. A process according to claim 1, wherein said open-cell foam has a CLD 40% hardness, measured in accordance with ISO3386/1, of less than 20 kPa.

19. A process according to claim 1, wherein said core layer (1) is laid onto the lower mold surface (5) and the curable, foamable composition (7) is sprayed on top of the core layer (1) when it is lying on the lower mold surface (5).

20. A process according to claim 1, wherein it is a discontinuous process wherein the foamed article is produced in a mold (6, 8) comprising an upper mold section (8) forming the upper mold surface (9) and a lower mold section (6) forming the lower mold surface (5), the upper (8) and lower mold sections (6) being movable with respect to one another between a molding and a demolding position, in which process the core layer (1) is laid onto the lower mold surface (5) in the demolding position of the mold sections (6, 8), the foamable composition (7) is sprayed onto the core layer (1) lying onto the lower mold surface (5), the mold sections (6, 8) are brought into their molding position, and, after the foamable composition (7) has been allowed to foam, the mold sections (6, 8) are brought into their demolding position and the produced article is removed from the mold.

21. A process according to claim 1, wherein it is a continuous process wherein the upper (9) and lower mold surfaces (5) are formed by a conveyor system.

22. A process according to claim 1, wherein said lower mold surface (5) and/or said upper mold surface (9) is three-dimensionally shaped.

23. A process according to claim 1, wherein
the foamable composition (7) is sprayed on a first side of the core layer (1),
the core layer (1) has a second side, opposite the first side, which second side is covered with at least one second cover layer (2),
the at least one second cover layer (2) is applied onto lower mold surface (5),
at least one insert (10), which has a laterally projecting head portion (12), is applied through the at least one second cover layer (2) into a recess (11) in the lower mold surface (5), either before or after having applied the core layer (1) onto the lower mold surface (5), the projecting head portion (12) being maintained at a distance from the lower mold surface (5) to allow foamable composition (7) to penetrate between the projecting head portion (12) and the lower mold surface (5).

24. A process according to claim 1, wherein the after having applied the core layer (1) onto the lower mold surface (5), at least one insert (10), which has a laterally projecting head portion (12), is applied through the core layer (1) into a recess (11) in the lower mold surface (5), the projecting head portion (12) being preferably maintained at a distance from the lower mold surface (5) to allow foamable composition (7) to penetrate between the projecting head portion (12) and the lower mold surface (5).

25. A process according to claim 1, wherein said open-cell foam comprises a reticulated foam.

* * * * *